United States Patent
Yang

(10) Patent No.: US 11,205,019 B2
(45) Date of Patent: Dec. 21, 2021

(54) MULTIPLE COMPUTING ENVIRONMENTS ON A COMPUTER SYSTEM

(75) Inventor: Wei-Shan Yang, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 1598 days.

(21) Appl. No.: 13/283,908

(22) Filed: Oct. 28, 2011

(65) Prior Publication Data

US 2013/0111163 A1 May 2, 2013

(51) Int. Cl.
*G06F 21/00* (2013.01)
*G06F 21/74* (2013.01)

(52) U.S. Cl.
CPC ...... *G06F 21/74* (2013.01); *G06F 2221/2105* (2013.01); *G06F 2221/2141* (2013.01); *G06F 2221/2149* (2013.01)

(58) Field of Classification Search
CPC ............ G06F 21/74; G06F 2221/2105; G06F 2221/2141; G06F 2221/2149
See application file for complete search history.

(56) References Cited

U.S. PATENT DOCUMENTS

| | | | | |
|---|---|---|---|---|
| 6,397,242 B1* | 5/2002 | Devine | ............... | G06F 9/45533 703/27 |
| 7,478,388 B1* | 1/2009 | Chen | .................. | G06F 9/45554 718/1 |
| 8,151,263 B1* | 4/2012 | Venkitachalam et al. | ........ | 718/1 |
| 8,285,835 B1* | 10/2012 | Deolasee et al. | ............. | 709/224 |
| 2005/0044548 A1 | 2/2005 | Page et al. | | |
| 2005/0188256 A1* | 8/2005 | Stager | .................. | G06F 11/1435 714/13 |
| 2007/0136356 A1 | 6/2007 | Smith et al. | | |
| 2008/0022385 A1 | 1/2008 | Crowell et al. | | |
| 2009/0276714 A1* | 11/2009 | Kandlikar et al. | ............ | 715/734 |
| 2010/0262977 A1 | 10/2010 | Havemose | | |
| 2011/0047613 A1 | 2/2011 | Walsh | | |
| 2011/0125812 A1 | 5/2011 | Kandasamy et al. | | |
| 2011/0126139 A1* | 5/2011 | Jeong | .................... | G06F 3/0482 715/767 |

OTHER PUBLICATIONS

VMWare, Understanding Clones, 2018, VMWare, www.vmware.com/support/ws5/doc/ws_clone_overview.html. (Year: 2018).*
Jones, Anatomy of the Linux kernel dated on or before Aug. 31, 2011 (12 pages).
MSDN, EWF Overview, Windows XP Embedded dated on or before May 13, 2011 (3 pages).

* cited by examiner

*Primary Examiner* — Jason W Blust
*Assistant Examiner* — Eric T Loonan
(74) *Attorney, Agent, or Firm* — Trop Pruner & Hu PC

(57) ABSTRACT

A first and a second computing environments are generated on a computer system based on a state of a logical storage unit of the computer system. The computing environments are associated with pieces of storage space located outside the logical storage unit. A write operation addressing the logical storage unit in one computing environment is directed to a piece of storage space associated with that computing environment.

24 Claims, 3 Drawing Sheets

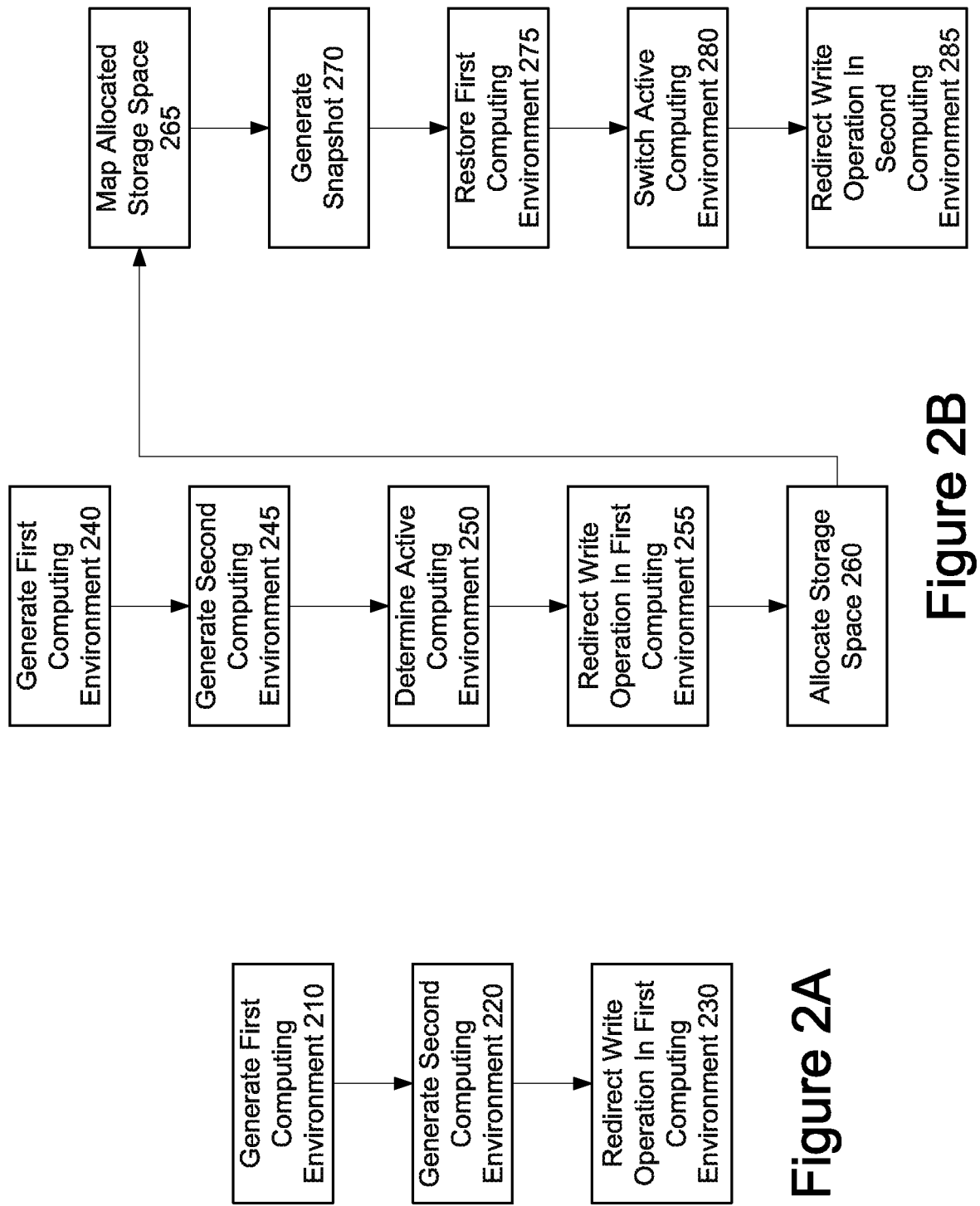

MULTIPLE COMPUTING ENVIRONMENTS ON A COMPUTER SYSTEM

BACKGROUND

As computers and the Internet gain popularity, many applications and websites have been developed to provide users with information and services they desire. Some of the applications and websites, although highly desirable, may impose high security risk to the users (e.g., vandalizing the user's computer or installing malware).

BRIEF DESCRIPTION OF THE DRAWINGS

FIG. 2 is a diagram of an example method for the system shown in FIG. 1A.

DETAILED DESCRIPTION

The present subject matter is now described more fully with reference to the accompanying figures, in which several examples of the subject matter are shown. The present subject matter may be embodied in many different forms and should not be construed as limited to the examples set forth herein. Rather these examples are provided so that this disclosure will be complete and will fully convey principles of the subject matter.

It is often desirable for a computer system to provide users with the ability to access several isolated computing environments (e.g., for different purposes such as working and entertaining). Thus, a way to provide several computing environments on a computer system is desirable.

Figure 1B:
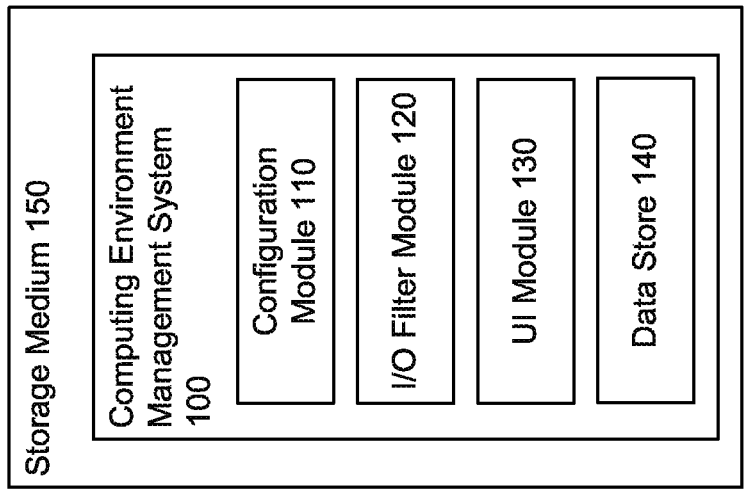
FIG. 1B is a diagram of an example storage medium storing an implementation of the system shown in FIG. 1A.
Figure 1A:
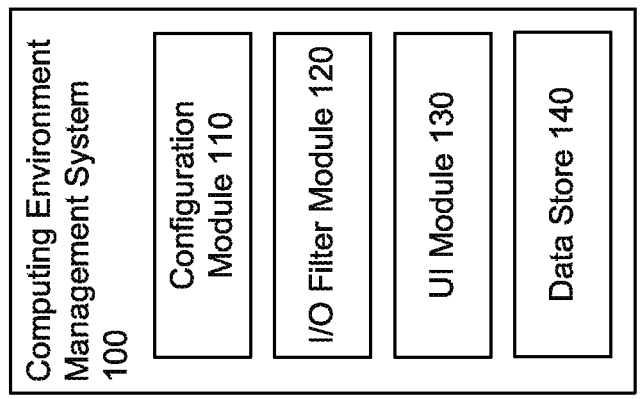
FIG. 1A is a diagram of an example architecture for a computing environment management system.

FIG. 1A illustrates one example system architecture for a computing environment management system 100 that provides users with the ability to access multiple isolated computing environments on a computer system. A computing environment is a platform for applications executed thereon to access various components of the computer system (e.g., storage devices such as hard drives, communicating devices such as a network card). The computing environment management system 100 includes a configuration module 110, an input/output (I/O) filter module 120, a graphical user interface (UI) module 130, and a data store 140.

The configuration module 110 provides the functions of generating multiple computing environments and switching among the generated computing environments. In one example, multiple isolated computing environments can be generated from a same base state (also called the "base point") of the computing system hosting the system 100. The computing environments are initially the same (the same initial state) and progress differently without affecting each other as different operations/events take place in the different computing environments. A state of a computing environment refers to the collection of states of applications, drivers, and systems (e.g., the operating system, the file system) running within the computing environment. For example, the state of an application includes data such as its inputs, outputs, and contents of its resources such as allocated memory. A state of a computing system refers to the collection of states of applications, drivers, systems, executed thereon and data stored on an active logical storage unit (also called the "active storage") of the computing system. A logical storage unit is a virtual device accessible by a file system for storing and/or accessing data. An example logical storage unit is a partition of a non-transitory computer-readable storage medium (e.g., a hard drive, compact disk read-only memory (CD-ROM), DVD, or a solid-state memory device).

To generate a computing environment, the configuration module 110 protects the content of the active storage from being modified by subsequent write operations targeting the active storage (e.g., keeping the content of the active storage at its base state). The write operations can be originated in the computing environment being generated or any other computing environment generated at the current state of the computing system. In addition, the configuration module 110 sets aside a piece of storage space on another logical storage unit to host data modified by the write operations in that computing environment. For example, the active storage may be the primary partition of a local hard drive hosting the operating system, the file system, and the computing environment management system 100, and the other logical storage unit may be a secondary partition inaccessible by (or invisible to) the file system.

The configuration module 110 sets aside different storage spaces for different computing environments. In one example, different computing environments are assigned different logical storage units (e.g., different hard drive partitions). Alternatively or additionally, different computing environments may be assigned different storage spaces within a logical storage unit. The storage space set aside for a computing environment is called the overlay storage for that computing environment. Storage sectors (e.g., 256-byte blocks) in the overlay storage of a computing environment are allocated as needed for hosting modified data on behalf of the active storage. A table mapping the allocated storage sectors in the overlay storage with the corresponding storage sectors in the active storage is also stored in the overlay storage.

The computing environments are isolated from each other. Operations performed and events incurred in one computing environment do not affect any other computing environments. By setting aside different overlay storages to different computing environments and hiding the overlay storages from the applications and systems running on the computing environments, the configuration module 110 stores data modified in different computing environments separately, and thus ensures isolations among the computing environments. In addition, applications in a computing environment (except the system 100) have no knowledge about the other computing environments and cannot access data resided therein. A user can switch freely among the generated computing environments. The configuration module 110 keeps a reference (e.g., a pointer) of the overlay storage (and a reference of the corresponding mapping table) of the present computing environment (also called the active computing environment). In order for the configuration module 110 to switch from one computing environment to another computing environment, the configuration module 110 changes the reference to refer to the overlay storage of the latter computing environment. In one example, the computing environment switch (or creation) requires the computer system to be reset (e.g., reboot, logout).

In one example, the configuration module 110 provides the function of generating snapshots for a computing environment and the ability of restoring the computing environment to the points when the snapshots were taken (e.g., to recover from damages caused by events incurred after the snapshots, such as virus infections). To generate a snapshot for a computing environment, the configuration module 110 stores in the overlay storage of the computing environment a copy of the storage sectors allocated for the computing environment and the corresponding mapping table. In order for the configuration module 110 to restore the computing environment according to a snapshot, the configuration module 110 replaces the storage sectors allocated for the computing environment with the storage sectors of the snapshot, and similarly replaces the mapping table. In one example, the computing environment restoration and/or the snapshot generation require the computer system to be reset.

The input/output ("I/O") filter module 120 intercepts I/O operations incurred in the active computing environment, and redirects write operations to the associated overlay storage according to the mapping table, such that the modified data are stored in corresponding storage sectors. If an I/O operation is addressed to a storage sector in the active storage, and the address of the storage sector is included in the mapping table, the I/O filter module 120 determines that the content of the storage sector has been updated and redirects the I/O operation to the corresponding address (as indicated in the mapping table) in the associated overlay storage. If no storage sector has been allocated for a write operation, the I/O filter module 120 allocates one or more storage sectors for the write operation and updates the mapping table to reflect the allocation. The I/O filter module 120 also redirects read operations of the modified data to the overlay storage allocated for that computing environment according to the mapping table.

In one example, the I/O filter module 120 utilizes a write filter technology to redirect the I/O operations. The write filter technology is a technique that filters writes addresses to a volume to another medium instead of physically writes to the volume itself. An example of the write filter technology is the Enhanced Write Filter. The I/O filter module 120 is implemented as a layer that functions between the file system of the active computing environment and the storage device drivers. The I/O filter module 120 is transparent to the file system and redirects I/O operations onto the overlay storage of the active computing environment. As such, the file system (and other applications resided on the computer system) is unaware of the I/O operation redirection and the existence of the other computing environments and cannot cause damage to data stored in the other computing environment.

The user interface module 130 provides a graphical user interface (UI) for users to generate computing environments and snapshots, switch among computing environments, and restore a computing environment according to a snapshot. One example UI displays separate computing environments as parallel time threads (or timelines) and snapshots as distinct time points on the time threads. The active computing environment may be highlighted (e.g., displayed in a different color). A user can switch among the computing environments/snapshots by selecting the corresponding time thread/time point. Once the user makes a selection, the UI module resets the computer system such that the computer system will provide the selected (or restored) computing environment. Additionally or alternatively, the UI module 130 will provide the user with options to select or recover a computing environment when the computer system starts up (e.g., after the user successfully logs in).

The data store 140 stores data used by the computing environment management system 100. Examples of the data stored in the data store 140 include information about the generated computing environments (e.g., storage addresses that reference to the overlay storages) and snapshots. The data store 140 may be a database stored on a non-transitory computer-readable storage medium.

In one example, to ensure that system files (e.g., kernel boot files) are loaded correctly before the I/O filter module 120 is loaded, the system 100 executes a write filter aware kernel loader before the system files are loaded. The kernel loader is a module of the system 100 that uses the mapping table of the active computing environment to redirect I/O instructions for loading the system files, and thereby ensures that the correct system files are loaded.

One example of the system 100 is implemented as computer program instructions stored on a non-transitory computer-readable storage medium (e.g., a hard drive, a compact disk read-only memory (CD-ROM), DVD, or a solid-state memory device), as illustrated in FIG. 1B.

FIG. 2A is a flow diagram that shows an example method for the computing environment management system 100 to provide multiple computing environments on a computer system. As shown, in step 210, the system 100 generates a first computing environment, and sets aside a first piece of storage space located outside a logical storage unit for the first computing environment. The initial state of the first computing environment is based on the state of the logical storage unit at that moment. In step 220, the system 100 generates a second computing environment, and sets aside a second piece of storage space located outside the logical storage unit for the second computing environment. The initial state of the second computing environment is based on the state of the logical storage unit (e.g., the data stored thereon) when the second computing environment is generated and matches the initial state of the first computing environment. In step 230, the system 100 directs a write operation addressing the logical storage unit in the first computing environment to the first piece of storage space without affecting the second computing environment. If no storage space has been allocated in the first piece of storage space for the destination storage space of the write operation, the system 100 allocates the necessary storage space and maps the allocated storage space to the destination storage space. The system 100 can also switch to the second computing environment, and direct write operations in the second computing environment without affecting the first computing environment. The system 100 can also generate snapshots of the generated computing environments and restore the computing environments to earlier states based on the snapshots.

FIG. 2B is a flow diagram that shows another example method for the system 100 to provide multiple computing environments on a computer system. As shown, in step 240, the system 100 generates a first computing environment, and sets aside a first piece of storage space located outside a logical storage unit for the first computing environment. In step 245, the system 100 generates a second computing environment, and sets aside a second piece of storage space located outside the logical storage unit for the second computing environment. In step 250, the system 100 determines that the active computing environment is the first computing environment, and directs, in step 255, a write operation addressing the logical storage unit in the first computing environment to the first piece of storage space without affecting the second computing environment. In step 260, the system 100 allocates the necessary storage space and maps in step 265 the allocated storage space to the destination storage space. In step 270, the system 100 generates a snapshot of the first computing environment. In step 275 (e.g., after performing several write operations in the first computing environment), the system restores the first computing environment from the subsequent write operations based on the snapshot. In step 280, the system 100 switches to the second computing environment, and in step 285 directs write operations in the second computing environment without affecting the first computing environment.

The configurations and methods described above beneficially provide users with the ability of switching among multiple isolated computing environments within a computer system, and navigating among multiple states (e.g., snapshots) of a computing environment. These functionalities enable the users to mitigate security risks by performing different tasks in different computing environments without concerning about data in other isolated computing environments or restricting applications from accessing certain components of the computer system.

Figure 3:
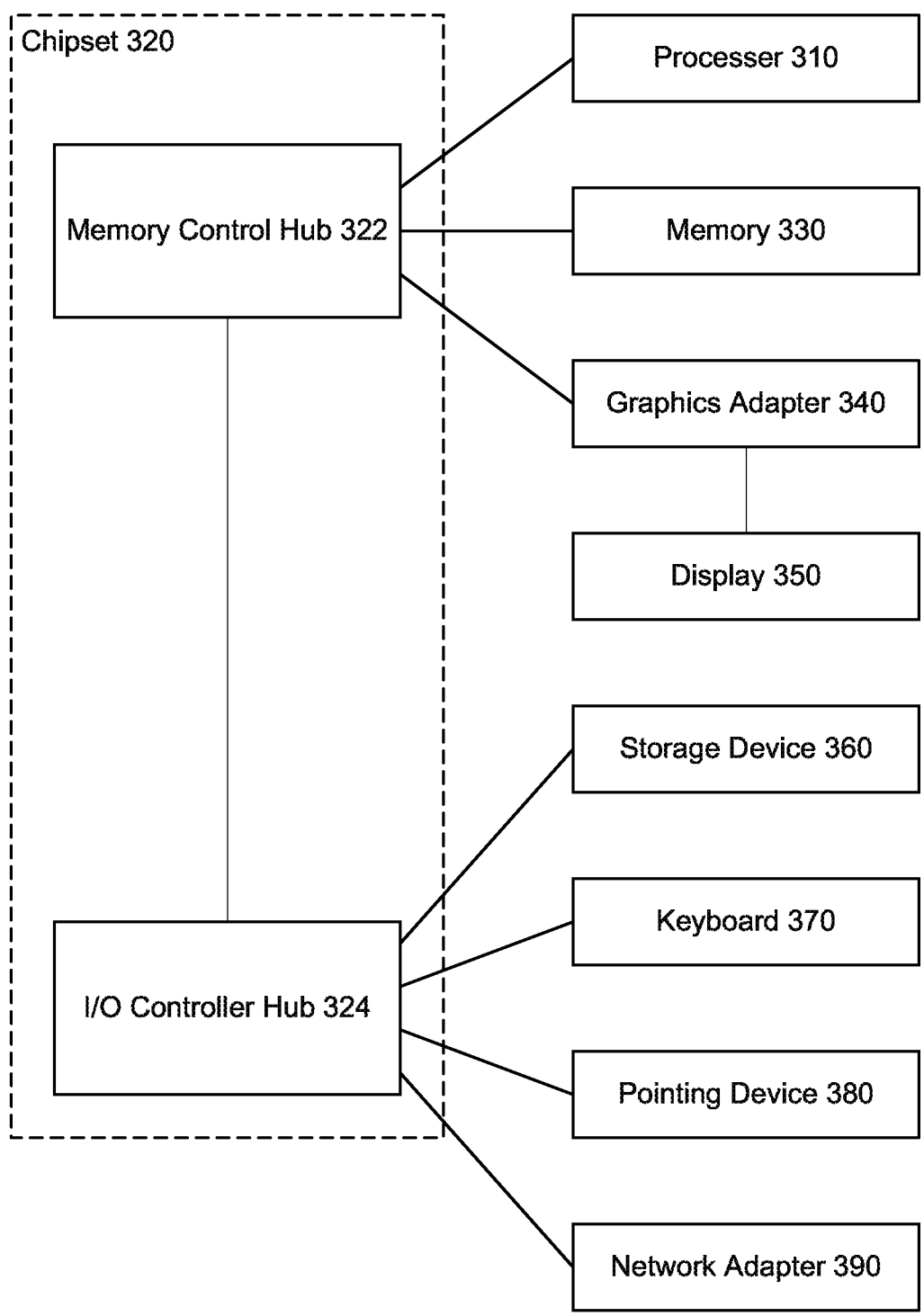
FIG. 3 is a diagram of an example computer system.

In one example, the entities shown in FIGS. 1A, 1B, 2A, and 2B are implemented using one or more computer systems. FIG. 3 is a high-level block diagram illustrating an example computer system 300. The computer system 300 includes at least one processor 310 coupled to a chipset 320. The chipset 320 includes a memory controller hub 322 and an I/O controller hub 324. A memory 330 and a graphics adapter 340 are coupled to the memory controller hub 322, and a display 350 is coupled to the graphics adapter 340. A storage device 360, a keyboard 370, a pointing device 380, and a network adapter 390 are coupled to the I/O controller hub 324. Other examples of the computer system 300 have different architectures.

The storage device 360 is a non-transitory computer-readable storage medium such as a hard drive, compact disk read-only memory (CD-ROM), DVD, or a solid-state memory device. The memory 330 holds instructions and data used by the processor 310. The pointing device 380 is a mouse, track ball, or other type of pointing device, and is used in combination with the keyboard 370 to input data into the computer system 300. The graphics adapter 340 displays images and other information on the display 350. The network adapter 390 couples the computer system 300 to one or more computer networks.

The computer system 300 is adapted to execute computer program modules for providing functionality described herein. As used herein, the term "module" refers to computer program logic used to provide the specified functionality. Thus, a module can be implemented in hardware, firmware, and/or software. In one example, program modules are stored on the storage device 360, loaded into the memory 330, and executed by the processor 310.

The types of computer systems 300 used by entities can vary depending upon the example and the processing power required by the entity. For example, the computing environment management system 100 might comprise a mobile telephone with limited processing power. A computer system 300 can lack some of the components described above, such as the keyboard 370, the graphics adapter 340, and the display 350.

One skilled in the art will recognize that the configurations and methods described above and illustrated in the figures are merely examples, and that the described subject matter may be practiced and implemented using many other configurations and methods. It should also be noted that the language used in the specification has been principally selected for readability and instructional purposes, and may not have been selected to delineate or circumscribe the inventive subject matter. Accordingly, the disclosure of the described subject matter is intended to be illustrative, but not limiting, of the scope of the subject matter, which is set forth in the following claims.

What is claimed is:

1. A method comprising:
generating, in a computer system, a first computing environment associated with a first piece of storage space located outside a logical storage unit, wherein an initial state of the first computing environment is based on a state of the logical storage unit;
generating, in the computer system, a second computing environment associated with a second piece of storage space located outside the logical storage unit and isolated from the first computing environment, wherein the first computing environment and the second computing environment are alternately activatable in the computer system responsive to selection in a user interface;
marking the first computing environment in the user interface as an active computing environment;
marking the second computing environment in the user interface as an inactive computing environment;
receiving, by a filter in the computer system, a write operation addressed to the logical storage unit; and
responsive to determining that the first computing environment is active while the second computing environment is inactive, redirecting, by the filter, the write operation to the first piece of storage space associated with the first computing environment that is active, without affecting the second piece of storage space associated with the second computing environment that is inactive, the write operation causing modification of data in the first piece of storage space to produce modified data so that the first and second computing environments store different data.

2. The method of claim 1, wherein an initial state of the second computing environment is based on the state of the logical storage unit and matches the initial state of the first computing environment.

3. The method of claim 1, further comprising:
directing, by the filter, a read operation to the modified data in the first computing environment.

4. The method of claim 1, further comprising:
allocating a sector of storage space in the first piece of storage space to store data of the write operation;
mapping, in a mapping table, the allocated sector of storage space to a sector in the logical storage unit identified in the write operation,
wherein redirecting the write operation is according to the mapping table.

5. The method of claim 1, further comprising:
restoring the first computing environment based on a snapshot generated for the first computing environment.

6. The method of claim 1, further comprising:
switching from the first computing environment to the second computing environment, the switching causing the first computing environment to be inactive, and the second computing environment to be active; and
after the switching, directing, by the filter, a second write operation addressing the logical storage unit to the second piece of storage space associated with the second computing environment that is active, without affecting the first piece of storage space associated with the first computing environment that is inactive.

7. The method of claim 6, further comprising:
prior to the switching, maintaining, by configuration instructions executed in the computer system, a reference that points to the first piece of storage space associated with the first computing environment that is active; and
after the switching, changing, by the configuration instructions, the reference to point to the second piece of storage space associated with the second computing environment that is active.

8. The method of claim 6, wherein the switching is in response to a user request comprising a selection, in the user interface, of information representing the second computing environment.

9. The method of claim 8, wherein marking the first computing environment in the user interface as the active computing environment and marking the second computing environment in the user interface as the inactive computing environment occur prior to the switching.

10. The method of claim 1, wherein the first piece of storage space comprises a first storage partition and the second piece of storage space comprises a second storage partition.

11. The method of claim 1, wherein the redirecting is transparent to a file system in the computer system, and the file system is unaware of the redirecting of the write operation.

12. The method of claim 1, wherein redirecting the write operation to the first piece of storage space associated with the first computing environment that is active, without affecting the second piece of storage space associated with the second computing environment that is inactive, maintains isolation between data stored in the first and second computing environments.

13. A non-transitory computer-readable storage medium storing instructions that upon execution cause a computer system to:
generate a first computing environment associated with a first piece of storage space located outside a logical storage unit, wherein an initial state of the first computing environment is based on a state of the logical storage unit;
generate a second computing environment associated with a second piece of storage space located outside the logical storage unit and isolated from the first computing environment, wherein the first computing environment and the second computing environment are alternately activatable in the computer system responsive to selection in a user interface;
mark the first computing environment in the user interface as an active computing environment;
mark the second computing environment in the user interface as an inactive computing environment;
receive, by a filter, a write operation addressed to the logical storage unit;
responsive to determining that the first computing environment is active while the second computing environment is inactive, redirect, by the filter, the write operation to the first piece of storage space associated with the first computing environment that is active, without affecting the second piece of storage space associated with the second computing environment that is inactive, the write operation causing modification of data in the first piece of storage space to produce modified data so that the first and second computing environments store different data; and direct, by the filter, a read operation to the modified data in the first computing environment.

14. The non-transitory computer-readable storage medium of claim 13, wherein the instructions upon execution cause the computer system to further:
switch from the first computing environment to the second computing environment, the switching causing the first computing environment to be inactive, and the second computing environment to be active; and
after the switching, direct another write operation addressing the logical storage unit to the second piece of storage space associated with the second computing environment that is active, without affecting the first piece of storage space associated with the first computing environment that is inactive.

15. The non-transitory computer-readable storage medium of claim 14, wherein the switching is in response to a user request submitted through a user interface, the user request comprising a user selection of information displayed in the user interface, the information representing the second computing environment.

16. The non-transitory computer-readable storage medium of claim 15, wherein marking the first computing environment in the user interface as the active computing environment and marking the second computing environment in the user interface as the inactive computing environment occur prior to the switching.

17. The non-transitory computer-readable storage medium of claim 14, wherein the instructions upon execution cause the computer system to:
prior to the switching, maintain, by a configuration module, a reference that points to the first piece of storage space associated with the first computing environment that is active; and
after the switching, change, by the configuration module, the reference to point to the second piece of storage space associated with the second computing environment that is active.

18. The non-transitory computer-readable storage medium of claim 13, wherein the instructions upon execution cause the computer system to further:
allocate a sector of storage space in the first piece of storage space to store data of the write operation; and
map, in a mapping table, the allocated sector of storage space to a sector in the logical storage unit identified in the write operation,
wherein redirecting the write operation is according to the mapping table.

19. The non-transitory computer-readable storage medium of claim 13, wherein the read operation reads the modified data in the first computing environment that is active, the modified data that is read not present in the second computing environment that is inactive.

20. A computer system comprising:
at least one processor to:
generate a first computing environment associated with a first piece of storage space located outside a logical storage unit,
generate a second computing environment associated with a second piece of storage space located outside the logical storage unit and isolated from the first computing environment, wherein an initial state of the first computing environment is based on a state of the logical storage unit, and an initial state of the second computing environment is based on the state of the logical storage unit and matches the initial state of the first computing environment, wherein the first computing environment and the second computing environment are alternately activatable in the computer system responsive to selection in a user interface; and mark the first computing environment in the user interface as an active computing environment;

mark the second computing environment in the user interface as an inactive computing environment;

a filter executable on the at least one processor to:

receive a write operation addressed to the logical storage unit, and responsive to determining that the first computing environment is active while the second computing environment is inactive, redirect the write operation to the first piece of storage space associated with the first computing environment that is active, without affecting the second piece of storage space associated with the second computing environment that is inactive, the write operation causing modification of data in the first piece of storage space to produce modified data so that the first and second computing environments store different data.

21. The computer system of claim 20, wherein the at least one processor is further configured to:

switch from the first computing environment to the second computing environment, the switching causing the first computing environment to be inactive, and the second computing environment to be active, and after the switching, direct a second write operation addressing the logical storage unit to the second piece of storage space associated with the second computing environment that is active, without affecting the first computing environment associated with the first computing environment that is inactive.

22. The computer system of claim 20, further comprising the user interface to display information representing the second computing environment, and receive a user request switching from the first computing environment to the second computing environment, the user request comprising a user selection of the information displayed in the user interface and representing the second computing environment.

23. The computer system of claim 22, wherein, prior to the switching:

the user interface marks the first computing environment as the active computing environment; and the user interface marks the second computing environment in the user interface as the inactive computing environment.

24. The computer system of claim 20, wherein the filter is executable on the at least one processor to direct a read operation to the modified data in the first computing environment, and the read operation reads the modified data in the first computing environment that is active, the modified data that is read not present in the second computing environment that is inactive.

* * * * *